United States Patent
Degeilh et al.

(10) Patent No.: US 11,915,082 B2
(45) Date of Patent: Feb. 27, 2024

(54) OPTIMIZED PROCESS FOR GRAPHIC PERSONALIZATION OF CHIP-CARD MODULES AND OBTAINED MODULE

(71) Applicant: THALES DIS FRANCE SAS, Meudon (FR)

(72) Inventors: Line Degeilh, Aubagne (FR); David Byrne, Aix en Provence (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/912,894

(22) PCT Filed: Mar. 17, 2021

(86) PCT No.: PCT/EP2021/056758
§ 371 (c)(1),
(2) Date: Sep. 20, 2022

(87) PCT Pub. No.: WO2021/197843
PCT Pub. Date: Oct. 7, 2021

(65) Prior Publication Data
US 2023/0161991 A1    May 25, 2023

(30) Foreign Application Priority Data
Mar. 31, 2020  (EP) ..................... 20315082

(51) Int. Cl.
*G06K 19/077*    (2006.01)
*G06K 1/12*    (2006.01)
(52) U.S. Cl.
CPC ......... *G06K 19/07716* (2013.01); *G06K 1/12* (2013.01)

(58) Field of Classification Search
CPC ..................... G06K 19/07716; G06K 1/12
See application file for complete search history.

(56) References Cited

U.S. PATENT DOCUMENTS 5,681,491 A * 10/1997 Merlin ................ G06K 1/126
                                                       235/487
6,259,035 B1   7/2001 Truggelmann et al.
(Continued)

FOREIGN PATENT DOCUMENTS

| EP | 2720175 A1 | 4/2014 |
| WO | 9731323 A1 | 8/1997 |
| WO | 2017076780 A1 | 5/2017 |

OTHER PUBLICATIONS

International Search Report (PCT/ISA/210) and Written Opinion (PCT/ISA/237) dated Jun. 15, 2021, by the European Patent Office as the International Searching Authority for current International Application No. PCT/EP2021/056758—[12 pages].

*Primary Examiner* — Seung H Lee

(57) ABSTRACT

Provided is a process for manufacturing a standard chip-card module comprising metallized contacts (P1-P6) defining a graphic design comprising visible parts formed from lines, segments or dots, a first portion (2A, 12A) of which passes right through the thickness of the metallized contacts (P1-P6) and a second portion (2B, 12B) of which is formed only superficially on the upper external surface of the metallized contacts (P1-P6). The second portion (2A, 12A) is produced in the continuity of the first portion, to form said graphic design. Other embodiments directed to a module resulting from the process is disclosed.

7 Claims, 3 Drawing Sheets

(56) References Cited

U.S. PATENT DOCUMENTS

| | | | |
|---|---|---|---|
| 11,068,767 B2* | 7/2021 | Nguyen | G06F 21/44 |
| 2011/0210177 A1* | 9/2011 | Pepin | G06K 19/07372 |
| | | | 235/492 |
| 2015/0287027 A1 | 10/2015 | Schmidt et al. | |

* cited by examiner

— Separation lines
— Surface lines

Required graphic

Non-ISO-compatible graphic

OPTIMIZED PROCESS FOR GRAPHIC PERSONALIZATION OF CHIP-CARD MODULES AND OBTAINED MODULE

FIELD

The invention relates to an optimized process for graphic personalization of chip-card modules.

In particular, it relates to a process for manufacturing a standard chip-card module having metallized contacts defining a design consisting of at least lines, segments or dots, and in which a first part of the lines, segments or dots of the design completely cross the metallized contacts, and second parts of the lines, segments or dots are formed only on an upper surface portion of the metallized contacts.

BACKGROUND

The invention may mainly relate to chip-cards for banking, telecommunications, or identity. Until now, chip-card module designs were linked to the chip-card and module manufacturer (Gemalto/Thales DIS, Idemia, and G&D have their own design and general appearance of the shapes of the electrical contact pads) or to the open-source tool, with years of improvement especially to increase reliability.

A chip-card integrated circuit module compliant with the ISO 7816 or 7810 standards generally comprises electrical contact pads (6 or 8) arranged on an insulating substrate. An integrated circuit chip is carried on the side of the insulating substrate generally placed under the substrate. (In some cases, it is possible to have a reverse structure, with the contact pads under a perforated insulating substrate at the standardized mandatory electrical contact areas as per ISO 7816 or 7810).

An old patent of the applicant is known, EP0589732 (B1), describing a process of laser-marking chip-card modules to mark a logo on the noble part of the surface metallization or passivation, above the lower copper layer of the contact pads. This allows the passivation to remain unaffected and to maintain a barrier against corrosion.

Also known is a patent of the applicant, EP1073997 (A1, describing a graphic personalization of chip-card modules, in particular with the character "Mickey". The contact pads comprise a subtle combination of metal and non-metal parts on the insulating substrate of the chip-card module, while making the separation lines of the contact pads match up with lines or contours of the head of "Mickey".

Customized modules are known, for example from the company SPS, with perforations or recesses forming small designs or logos inside the conventional metal contacts above the dielectric substrate. Each manufacturer-specific module can carry or display a customer's logo within a predefined contact pad. The manufacturer's modules can differ from one customer to another only by the different logo requested by or specific to each customer. However, the contour of the contact pads and the general appearance of the manufacturer's module is retained from one customer to another. The result of the graphic personalization is close to that of the patent EP0589732 (B1) with the difference that in the SPS modules, the lines can pass completely through the thickness of the metallizations.

In the fall 2019, the company Apple introduced its own bank card with an associated custom module, driving a new trend of graphic personalization of modules. Many banks now want their own design linked to their brand.

Central contacts disposed within an insulating substrate surface surrounding the contact pads are connected by conductive vias through the insulating substrate to plated metal interconnection areas on the other, hidden side of the substrate. A chip is typically carried on the side of the insulating substrate opposite the metallization areas and connects the interconnection areas.

This new module is expensive, especially because of the metallizations on each opposite side of the substrate and the conductive vias through the substrate.

Current solutions exist with a total etching of the pads combined with conductive vias, but are expensive and more complex. In addition, they lead to reducing the size of the integrated circuit chips that can be included in the space dedicated behind a central contact pad, and these solutions generate more constraints in the management of mechanical strength reliability.

The inventors recognized that certain module designs or patterns comprising a company logo or graphic personalization, (such as an octagonal shape in the center of contact pads), are not possible today with standard gold-plating technology with electrolysis on both sides of a substrate.

In particular, they detected that some designs lacked metallic continuity between the edges and the center of the module contact pads. The only solution seemed to be the one used above for the Apple modules, with inherent disadvantages, notably cost.

SUMMARY

In particular, the invention aims at solving the above-mentioned disadvantages.

The invention provides difficult and constrained specific designs of customized modules in a more cost-effective manner. This objective should be achieved, preferably, while maintaining a good level of reliability of mechanical resistance to the bending/torsion of the module.

The invention also aims at a more ecological or ethical solution with less gold linked to the conductive vias.

The invention proposes to realize the design of the contact pads and that of the graphic personalization by a particular combination of an extreme surface engraving technology (a few nm), in particular laser, and a standard engraving, in particular copper, on the whole thickness of the pads.

To this end, the invention has as its object a process for making a standard chip-card module having metallized contacts defining a graphic design comprising visible portions formed of lines, segments or dots, a first part of which completely crosses the metallized contacts over their thickness and a second part of which is formed only superficially on the upper external surface of the metallized contacts; the process is characterized in that said second part is produced in the continuity of the first part, in order to form said graphic design.

Thus, we obtain a graphic personalization of the module with mechanical behavior that is advantageously preserved or improved.

The question of the reliability of the mechanical strength really arises. From the point of view of technical experts, the straight lines thoroughly engraved inside the Copper (35 nm) introduce some specific constraints inside the module, above the IC chips and interconnect wire bonds or flip-chip interconnects.

A proposal of the invention according to a preferred process is to etch (or separate) by a standard process (chemical or other) only those contact pads that really need to be separated, in particular the main ISO 7816-2 contact pads.

The protective metallization (Nickel, Au, Palladium and/or other noble metals and/or alloys) used on the modules (generally on the copper layers) can also be a standard process, notably electrochemical. The conductive vias are not needed anymore (or at least their quantity is very limited, particularly to 2). The solution is more profitable, less gold-consuming, ecological and ethical.

According to other characteristics or preferred embodiments:
  The first part of visible portions coincides with separation lines of the contact pads and said second part extends across said contact pads or standardized areas;
  The first part can be obtained by means of a process for forming contact pads using a technique such as electrochemical etching, mechanical cutting, metal deposition, in particular by plasma (LIFT), spraying, or jetting of conductive material;
  The second surface part can be obtained by means of a surface marking process on the upper surface of the metallizations, selected from laser engraving, electrochemical etching, abrasive particle blasting, inkjet printing, screen printing, or additive or subtractive marking;
  The visible portions of the graphic design are formed by geometric shapes comprising lines, segments, straight or curved lines, circles, dots, dashed lines, broken lines, surfaces or contrasting areas whose surface condition is distinct from adjacent areas;

The invention also relates to the module corresponding to the process and a card comprising the module with visually optimized graphic personalization and good mechanical resistance to bending and/or torsion.

DETAILED DESCRIPTION

To begin with, the same references from one figure to the other, indicate identical or similar components.

Figure 1A:
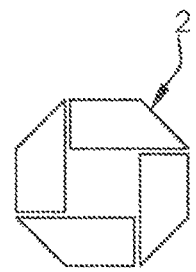
FIG. 1 illustrates a module according to a first embodiment with the mandatory ISO 7816-2 (C1-C7) standardized areas.
Figure 1B:
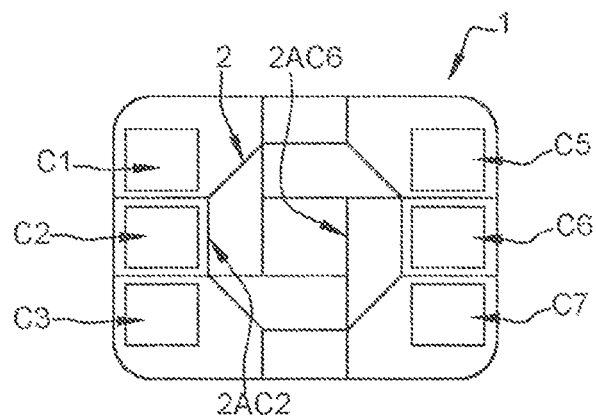

FIG. 1B illustrates a customized module with a logo or trademark of a company (Chase Manhattan Bank) from FIG. 1A. It is in accordance with a first embodiment of the invention. It includes mandatory ISO 7816-2 standard fields (C1-C7);

In accordance with a possible step of this mode: The position of the ISO areas C1-C7 is to be considered for the graphic personalization of this module. These standard ISO areas are integrated metal areas that must not be altered to allow electrical contact with a matching contact reader connector.

These areas C1-C7 must fit into or be included in the six contact pads P1-P7; these pads must be electrically separated to avoid short circuits between them. Here, the design of the customization is facilitated since the areas C1-C7 fall into generally separate contact pad positions. However, not all requested graphical customization designs can be based on this rule (see in particular FIG. 7)

Figure 2:
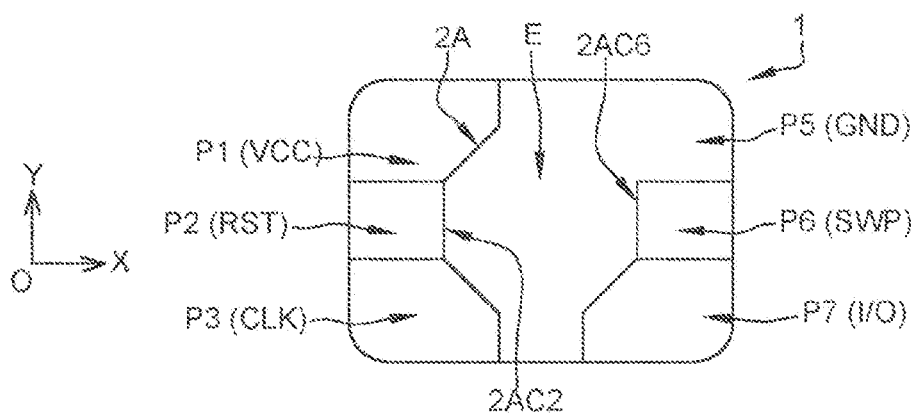
FIG. 2 illustrates a step of creating the lines, segments of separation of the contact pads of the module of FIG. 1.

In FIG. 2, in a subsequent step, the specific engraved lines 2A necessary for the personalization are defined. The lines 2A (including 2AC2, 2AC6) correspond to those that must be kept in a conventional etching design (electrochemical, cutting or other)

The technical benefits are as follows:
  The slot E that can accommodate the integrated circuit chip is not limited;
  The locations (not shown) of the interconnection perforations of the chip through an insulating substrate for interconnecting, (especially by soldered wire), the contact pads P1-P7 and the chip studs is easily manageable;
  Only the lines 2A can weaken the mechanical strength of the module at a predetermined bend (5D, 5G, 6H, 6L—FIG. 3 for a conventional standard configuration);
  For the reliability of the module (the separation lines of the contact pads are broken as much as possible so that they do not extend transversely and longitudinally (like the lines 5D, 5G, 6H, 6L—FIG. 3) in the metal layer of the module in a straight line and generate a predetermined line of breakage of the metal layer of the contact pads), thus the risks of embrittlement are greatly reduced;
  The design of the metallizations P1-P7 is possible without a conductive via for the interconnection of the electronic chip and without the use of metallizations on two opposite sides of the insulating substrate supporting the metallizations. A reduction in costs can thus be achieved;
  Standard metal plating (or etching) on only one side of the insulating substrate carrying the external contacts is possible, also allowing for cost reduction.

Figure 3:
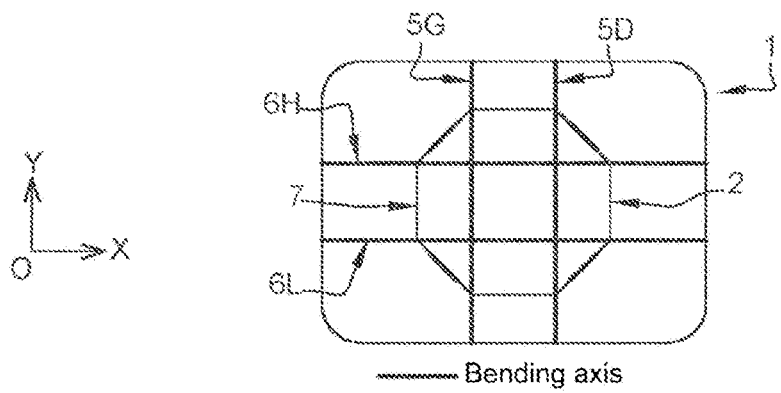
FIG. 3 illustrates preferential bending lines and therefore embrittlement lines of the module of FIG. 1.

FIG. 3 shows an analysis of the bending axes 5D, 5G, 6H, 6L, during mechanical bending/torsion tests on modules that are completely etched through the entire thickness of the metallizations (contact pads). There is a significant risk of reliability of the mechanical strength of the module during mechanical bending tests (bending/twisting).

Figure 4:
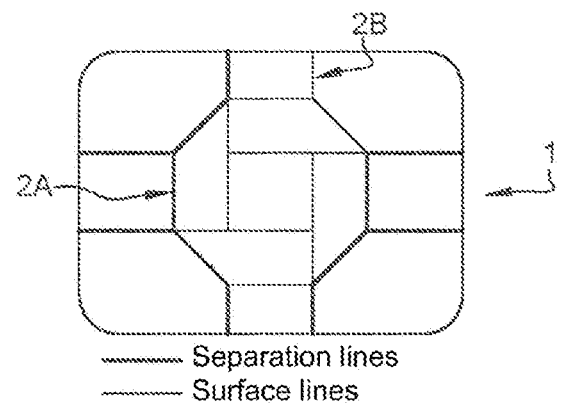
FIG. 4 illustrates a step of creating the lines, segments of completing the lines, segments of the previous figure.

FIG. 4 shows a step for the creation of the second parts 2B of portions of lines, segments, dots that complete or are complementary to the first parts 2A of portions of lines, segments, dots in FIG. 2. The part of lines or segments 2B is produced in a subsequent step, preferably after gold or palladium plating of the contact pads P1-P7.

For these second parts 2B, the process of the invention can envision implementing a laser marking with a specific wavelength among IR, UV, red, blue, or green laser to construct this part of lines, segments 8 and to finalize the graphic personalization of the design 2 of FIG. 1B corresponding to the logo 2 (FIG. 1A).

These lines 2B can be shallow by only a few nanometers, for example less than 1 nm or 5 nm or even less than 15 nm). In the example, they are about 5 nm deep. They can be between 1 and 15 nm. The minimum thickness of gold on this type of module can be 40 nm (standard thickness can be 70 nm with a max of 110 nm)

Figure 5:
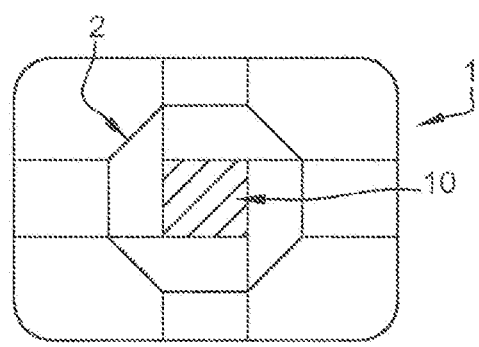
FIG. 5 illustrates the graphically finished custom module obtained according to the first embodiment and showing the complete design or logo.

Preferably, the superficial lines 2B do not cross the entire thickness of the precious metal layer (such as gold or palladium); they do not affect the reliability or mechanical strength of the final module 1 obtained in FIG. 5, The combination of these two steps (creation 2A and 2B), including on the one hand the separation 2A of the contact pads P1-P7 and surface marking 2B is effective to more easily obtain a graphic personalization of the module.

The invention surprisingly makes it possible to achieve a logo appearance in a much larger form than in the background art, while being more economical and less prone to mechanical reliability problems. The reception area "E" of the electronic chip can be larger. This makes it possible to accommodate chips that require a larger footprint or maximum space without being hindered by the dividing lines 2A usually located around the chip.

Laser technology is now able to engrave these second surface portions (lines, segments, dots) in a width of about 100 nm wide and with a shallow nanometric depth (a few nm) with good precision and resolution, and without degrading the environmental resistance (without burning the surface or causing some exposure to atmospheric corrosion).

Another benefit of the laser marking 2B shown in FIG. 5 is the following: if there is a need for a central dark area 10 on the module, above chip location "E". A feasibility study showed that if the dark area 10 is located in the center of the module (and larger than the chip size), defects appear in reliability tests (Standard ISO 7610 bending test with three rollers).

The benefit of combining two distinct line marking processes 2A, 2B to compose a graphic design 2 is thus demonstrated.

Figure 6:
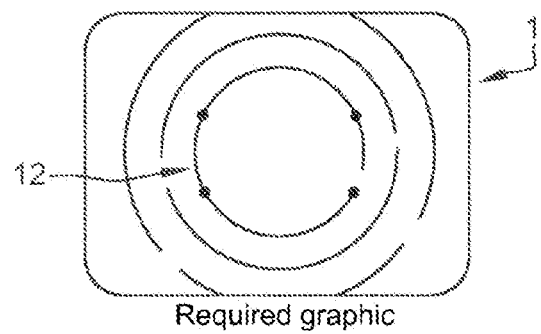
FIGS. 6 and 7 illustrate respectively a second graphic to be made on the module and its arrangement with respect to the ISO 7816-2 contact pads.
Figure 7:
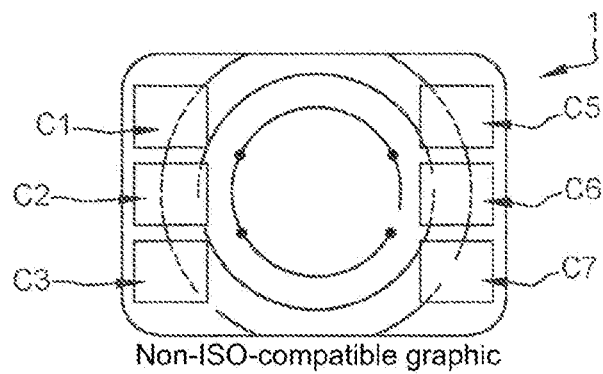

FIGS. 6 and 7 illustrate another design or pattern (or graphic) that can only be achieved by the method of the invention.

The (graphic) design or drawing 12 of FIG. 6 is hardly or not at all feasible today (not ISO 7816-2 compatible). It comprises uninterrupted circles as constraints for what the client wants produced.

In the initial drawing, normally separated contact pads P1-P7 are short-circuited.

The ISO areas C1 to C7 all have a common metal part in continuity at the zone delimited between the two outermost concentric circles.

The contact areas are therefore not in accordance with ISO 7816-2 and this design 12 would in principle be inadmissible for any manufacturer whose objective is to create customized modules in an optimal manner (with the benefits of the invention).

Now, with optional slight dimensional adjustments where appropriate, and primarily through the use of the invention, the design 12 can be achieved by a combination of two separate marking processes (one of which is a total (or complete) electrical separation or isolation of the contact pads P1-P7). It is now possible, by virtue of the invention, to propose a design, graphic or graphical pattern with optimized personalization while respecting the customer constraint imposing uninterrupted circles. Here, the surface laser marking on the outer surface of the metallizations does not affect the integrity of the mandatory ISO 7816-2 areas (C1-C7).

The mechanical reliability is not affected by the creation of circles or portions of circles 12A (first curved lines) separating the contact pads P1-P7. Mechanical reliability is also not affected by complementary circles or portions of circles 12B (second curved lines) introduced superficially on the metallizations, extending or completing the circles or portions of circles 12A (first curved lines) belonging to the personalized graphic design 12 and totally separating the contact pads P1-P7 over their thickness.

Figure 9:
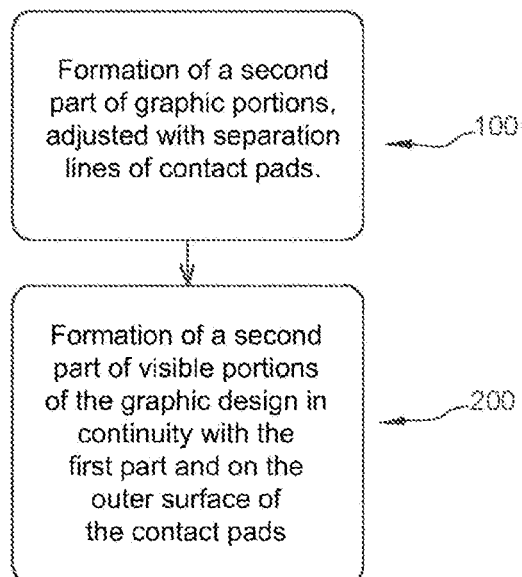
FIG. 9 illustrates steps of a process of the invention according to one general, possible mode of the invention.

In FIG. 9, important steps 100 & 200 of the process of the invention are now described according to one possible general mode. This general mode covers the two modes or examples described above.

According to a preferred characteristic of the general mode, a process for manufacturing a standard chip-card module 1 with metallized contacts (P1-P7) that define a graphical design 2 or 12 is described.

This design 2 or 12 may comprise visible portions formed in particular by lines, segments, or dots and of which a first part (2A, 12A) passes completely through the metallized contacts (P1-P6) over their thickness (to insulate them electrically from each other) and a second part (2B, 12B) is formed only superficially by marking on the upper external surface of the metallized contacts (P1-P6).

In step 100 according to an example for this preferred general mode, the process according to this mode may provide as a feature a formation of a first part of visible portions of a graphic design 2, 12. This step involves adjusting (or matching up) this first part of the visible portions with dividing lines 2A, 12A of contact pads (or vice versa: making separation lines passing near design portions match up with those same design portions).

The adjustment can include an operation of enlarging or shrinking the design to some extent. Without changing the overall appearance of the design, the dividing lines can be redefined or repositioned on the module areas to match up with portions of lines, curves, or dots of the design.

A dimensional adjustment (module sizing) (optional depending on the design to be represented), can preferably be carried out in order to have as large a design as possible for better visibility. In FIG. 1B, the design 2 is adjusted between the areas C1-C7.

The vertical portion (along the Y axis) of the design 2 (2AC2) is preferably placed as close as possible to the standard area C2 while the vertical portion (along the Y axis) of the design 2 (2AC6) on the FIG. 2 drawing is placed as close as possible to the area C6. Thus, the portions 2AC2 and 2AC6 in particular will be able to match up (or fit) with the portion of the separation line 2A separating the contact pad P2 from the contact area P5 and with the portion of the separation line 2A separating the contact area P5 from the area P6.

Figure 8:
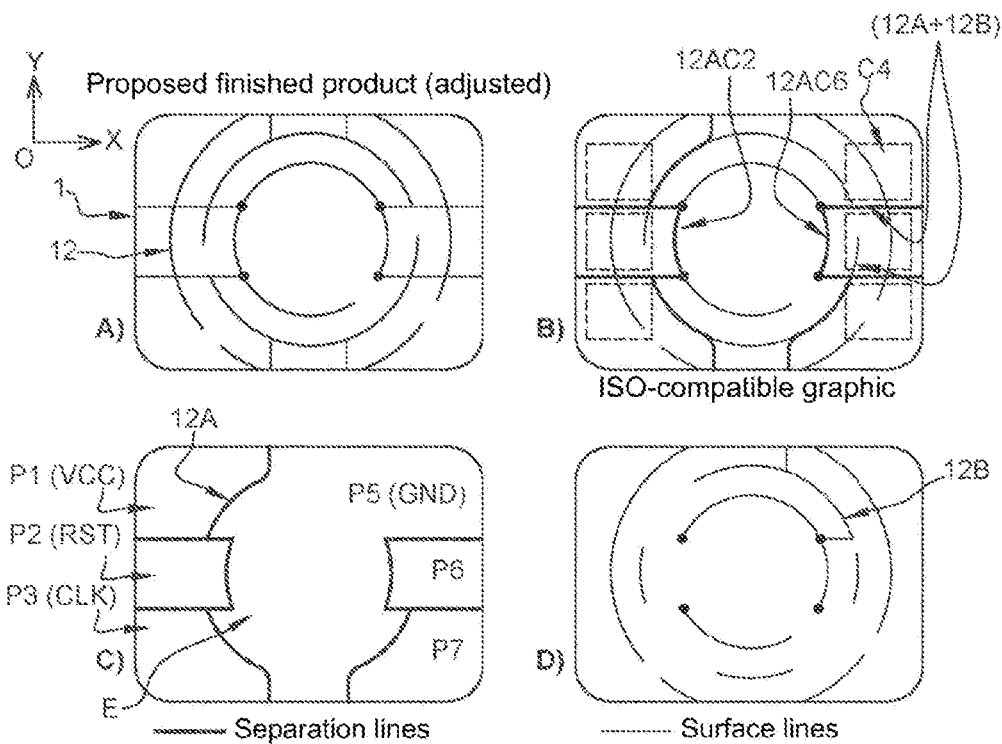
FIG. 8 illustrates the steps A-D for making the lines, segments for separating the contact pads of the module of FIG. 7 combined with a surface marking.

On the other hand, in FIG. 8 (B), the design 12 is positioned with only a part placed between the standard areas C2 and C6 (and in their proximity) while another complementary peripheral part of the design 12 may overlap these same standard areas C2 and C6.

The substantially vertical (along the Y axis) curved portion (12AC2) of the design 12 is preferably placed here as close as possible to the standard area C2 while the substantially vertical (along the Y axis) curved portion (12AC6) of the design 12 in the FIG. 8 drawing (B) is placed as close as possible to the area C6. Thus, the portions 12AC2 and 12AC6 of the design 12 will (for the purposes of the graphical design or graphic) be able to respectively match up or fit with a portion of a curved separation line 12A, one separating the contact pad P2 from the contact pad P5 and the other separating the contact pad P5 from the pad P6.

The separation lines 12A matching up with portions of graphic design 12 can also be determined in such a way that they do not extend rectilinearly over the entire height (along the Y-axis) or width (along the X-axis) of the module, respectively at the predetermined lines of embrittlement of the mechanical strength of the module 5G, 5D or 6H, 6L, FIG. 3.

Then, portions of the design 12 (e.g. inner circle) adjacent to the areas C1-C7 are matched with dividing lines 12A (arc-shaped), e.g. the electrical separation or isolation to be ensured between the contact pads P2 and P5 then P5 and P6—FIG. 8 (C).

The first part of the visible portions (2A, 12A) here coincides with FIG. 2, with separation lines of the contact pads. (We will see later that the second surface part (2B, 12B) can extend through or over said contact pads (P1-P6) or standardized areas C1-C7).

The first part of the separation portion (2A, 12A) can be obtained by means of a process for forming contact pads, including electrochemical etching, mechanical cutting, plasma metal deposition, processes for depositing conductive material on an insulating substrate, such as FPC (Fine Powder Coating) or LIFT (Laser Induced Forward Transfer), and various processes of spraying, sublimation, vacuum evaporation, and jetting of conductive material. In the example, the pads are preferentially separated by electrochemical etching.

In a preferred embodiment of the invention, the second part (2B, 12B) is made in continuity with the first part, to form the graphical designs 2 or 12. To illustrate, the process according to the preferred general mode may preferably comprise step 200:

In step 200 according to the example for this general mode, the method according to this mode may provide, as a second feature, a step of forming a second part 2B, 12B of visible portions of the graphical design 2, 12, in continuity with the first part 2A, 12A and on the external surface of the contact pads. This second part 2B or 12B portion of the design matches up with the rest of the design 2 or 12 (distinct from the first design portions).

This step can also be applied to the two examples described previously.

For better visibility, formation in continuity 2B, 12B is also preferably done in such a way that the design is as large as possible and extends beyond the standard areas C1-C7 towards the peripheral edge of the module. Thus, the second part of visible portions 2B, 12B of the graphic design 2, 12 is formed or marked superficially on the contact pads, ensuring here a continuity or extension of the first portions 2A, 12A. The second part of portions of lines, portions of curves or dots, (or even of surfaces) does not make it possible to completely separate the contact pads of the module over their entire thickness at this second part.

In the example, FIGS. 4 and 8, the second part 2B, 12B may extend across or overlap said contact pads (P1-P6) or standard areas C1-C7.

It can be observed that vertical lines (along the Y axis) of the second part 2B, 12B can be in extension of the separation lines 2A, 12A (corresponding to 5D or 5G—FIG. 3) of the contact pads P1-P7 without affecting or weakening the module's mechanical resistance in bending/torsion.

Likewise, it can be observed that horizontal lines (along the X axis) of the second part 2B, 12B can be in extension of the separation lines 2A, 12A (corresponding to 6H or 6L—FIG. 3) of the contact pads without affecting or weakening the module's mechanical resistance in bending/torsion.

The second surface part (2B, 12B) can be obtained using various surface marking processes on the upper surface of the metallizations, known to the skilled person.

Such a process can be selected from laser engraving, electrochemical etching, abrasive particle blasting, inkjet printing, screen printing, additive marking or subtractive marking. In the example, the marking is carried out by ablative laser. Its depth can be a few nanometers in particular 2 to 5 nm, or even between 5 and 15 nm.

With respect to the visible portions of the graphic design, these may be formed, in all examples, of any geometric shapes that may include lines, segments, straight or curved lines, circles, dots, dashed lines, broken lines, surfaces or contrasting areas whose surface condition is visibly distinct from adjacent areas. In the example, the marking is preferentially carried out by laser controlled by computer-aided means.

The separating grooves of a certain width of the contact pads can be filled with an insulator of any color. To ensure continuity of the portions 2A, 12A with 2B, 1B respectively, a marking 2B and 12B of the same width as 2A, 12A, can be made in continuity on the metallizations. Preferably, the laser marking creates a shallow groove (a few nanometers) in a noble protective layer.

This surface groove can cause a difference in the refractive index of the surface material, resulting in a different coloring of the surface.

This groove can be colored by inkjet printing or by printing with insulating or conductive material. Alternatively, the marking can be additive with an addition of material, preferably electrically conductive, on the surface of the contact pads. The surface additive marking can be a conductive deposit of a few nanometers as well.

Thus, we obtain a standard chip-card module 1 with metallized contacts P1-P6 defining a graphic design comprising visible portions formed by lines, segments or dots, of which a first part 2A, 12A crosses or completely separates the metallized contacts (P1-P6) over their layer thickness and of which a second part (2B, 12B) is formed only superficially on the upper external surface of the metallized contacts (P1-P6);

This module according to an example of the invention can be characterized by a second part 2A, 12A that is arranged in continuity or extension of the first part, to form the personalized graphic design 2 or 12.

On the contrary, in the background art, in particular certain modules from the company SPS, the personalization is necessarily confined to the surface of a contact pad generally in the center of P5.

The invention has the advantage of allowing the reception of a chip with a large seat or surface area in a location "E" opposite the pad P5 (FIG. 2 or FIG. 8-C)

Thus, the invention makes it possible to obtain, (after inserting or fastening, in a card body, one of the personalized modules described in any of the examples), a chip card whose module is graphically personalized in an optimized manner in terms of having larger dimensions and/or in terms of mechanical strength (without any risk of mechanical fragility).

The invention claimed is:
1. A process for manufacturing a standard chip-card module with metallized contacts (P1-P6) defining a graphic design comprising visible portions formed by lines, segments or dots, of which a first part (2A, 12A) completely crosses the metallized contacts (P1-P6) over their thickness and of which a second part (2B, 12B) is formed only superficially on the upper external surface of the metallized contacts (P1-P6), wherein said second part (2A, 12A) is realized in continuity with the first part, to form said graphic design.

2. The process according to claim 1, wherein that said first part of visible portions (2A, 12A) matches up with separation lines of the contact pads and said second part (2B, 12B) extends across said contact pads (P1-P6) or standardized areas (C1-C7).

3. The process according to claim 1, wherein that said first part (2A, 12A) is obtained by means of a process for forming contact pads from among electrochemical etching, mechanical cutting, plasma metal deposition (LIFI), spraying, and jetting of conductive material technique.

4. The process according to claim 1, wherein that said second surface part (2B, 12B) is obtained by means of a surface marking process on the upper surface of the metallizations selected from a process of laser engraving, electrochemical etching, abrasive particle blasting, inkjet printing, screen printing, or additive or subtractive marking.

5. The process according claim 1, wherein that said visible portions of the graphic design are formed by geometric shapes comprising lines, segments, straight or curved lines, circles, dots, dashed lines, broken lines, surfaces or contrasting areas whose surface condition is distinct from adjacent areas.

6. A standard chip-card module with metallized contacts (P1-P6) defining a graphic design comprising visible portions formed by lines, segments or dots, of which a first part (2A, 12A) completely crosses the metallized contacts (P1-P6) over their thickness and of which a second part (2B, 12B) is formed only superficially on the upper external surface of the metallized contacts (P1-P6), wherein that said second part (2A, 12A) is found in continuity with the first part, to form said graphic design.

7. The standard chip-card module according to claim 6 is comprised within a chip-card.

* * * * *